(12) United States Patent
Bagwell et al.

(10) Patent No.: US 8,855,801 B2
(45) Date of Patent: Oct. 7, 2014

(54) AUTOMATED INTEGRATION OF FEEDBACK FROM FIELD FAILURE TO ORDER CONFIGURATOR FOR DYNAMIC OPTIMIZATION OF MANUFACTURING TEST PROCESSES

(75) Inventors: Derek P. Bagwell, Rochester, MN (US); Joni L. Buttke, Norwalk, CT (US); Gary V. Tollers, Rochester, MN (US); Cheranellore Vasudevan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 11/873,455

(22) Filed: Oct. 17, 2007

(65) Prior Publication Data
US 2009/0105863 A1 Apr. 23, 2009

(51) Int. Cl.
G06F 19/00 (2011.01)
G06Q 50/04 (2012.01)
G06Q 10/06 (2012.01)

(52) U.S. Cl.
CPC ............... *G06Q 50/04* (2013.01); *G06Q 10/06* (2013.01)
USPC ............................ 700/108; 702/108; 702/113

(58) Field of Classification Search
USPC ....................... 700/108; 702/108, 113; 714/38
See application file for complete search history.

(56) References Cited

U.S. PATENT DOCUMENTS

| | | | | |
|---|---|---|---|---|
| 5,442,545 A | * | 8/1995 | Matsui et al. | 705/29 |
| 5,892,947 A | * | 4/1999 | DeLong et al. | 717/100 |
| 6,647,513 B1 | | 11/2003 | Hekmatpour | |
| 6,668,340 B1 | * | 12/2003 | Baker et al. | 714/38 |
| 6,883,150 B2 | * | 4/2005 | Soltis et al. | 716/4 |
| 7,055,065 B2 | * | 5/2006 | Farchi et al. | 714/38 |
| 7,356,436 B2 | * | 4/2008 | Bohizic et al. | 702/119 |
| 7,558,642 B2 | * | 7/2009 | Bagwell et al. | 700/108 |

OTHER PUBLICATIONS

Orso, Alessandro, et al; Leveraging Field Data for Impact Analysis and Regression Testing; ESEC/FSE 2003.
Fu, Chen, et al; Testing of Java Web Services for Robustness; ISSTA 2004.
Sprenkle, Sara, et al; A Case Study of Automatically Creating Test Suites from Web Application Field Data; TAV-WEB 2006.

* cited by examiner

*Primary Examiner* — Michael D Masinick
(74) *Attorney, Agent, or Firm* — Steven M. Greenberg, Esq.; CRGO Law

(57) ABSTRACT

The present invention addresses the deficiencies of the art in respect to the manufacturing test processes and provides a novel and non-obvious method, system and apparatus for dynamic optimization of manufacturing test coverage with automated integration of field failure feedback with the order configurator. In one embodiment of the invention, a manufacturing field failure feedback method can be provided. The method can include retrieving field failure data, analyzing the field failure data, storing failure analysis object information, modifying a manufacturing test case selection within the test case selection and order configurator based on using field failure data analysis, the test case selection including rules for test case selection and test case object information, and configuring a testing order with an optimized test case selection.

13 Claims, 3 Drawing Sheets

AUTOMATED INTEGRATION OF FEEDBACK FROM FIELD FAILURE TO ORDER CONFIGURATOR FOR DYNAMIC OPTIMIZATION OF MANUFACTURING TEST PROCESSES

BACKGROUND OF THE INVENTION

1. Statement of the Technical Field

The present invention relates to manufacturing test processes and more particularly to a method of improving the effectiveness of manufacturing test coverage.

2. Description of the Related Art

Generally, in a manufacturing system test environment, a factory assembles parts from suppliers into products, tests these products for full functionality and potential early failures, and finally ships functioning products to customers based on custom-order. If a customer experiences failure issues with a product, it is either repaired in the field or sent back to factory for repair. The field failure information is gathered on a regular basis for analysis for improving the engineering, manufacturing, and test processes. This, of course, is mostly a manual process.

Manufacturing test cases are generally designed based on inputs from system designers or engineering personnel to uncover issues during the manufacturing system integration phase. Reliability and availability issues including fault and performance degradation are often reported after a system has been installed and used. Usually, the most important and critical test cases are based on problems found in the field during product installation and up to three months after installation.

Typically, field failure data is manually analyzed then used to manually review manufacturing test cases. The field issues are gathered, then analyzed and managed by people and fed back manually to groups like Product Development and Manufacturing and Testing. Often, new test cases are manually added to the manufacturing test suite instead of optimizing existing test cases. Thus, the test case development process remains inefficient causing a slow process since it relies on manual optimization of new test cases to be added to the manufacturing test suite instead of optimizing existing test cases.

The ability of the manufacturing test process to ensure customer satisfaction can be measured based on test coverage. In order to properly target the test process it is important to understand the fault spectrum of interest, the likelihood of a defect or functional failure, and the impact of the failure on the customer. Issues with current manufacturing test coverage include the assumption that all failures are equally likely. Another issue is the impact of the failure eventually reaching the field. Current methods fail to incorporate the notion that not all defects or failures will have the same impact to the customer and not all test cases need to be run for a specific order configuration. For instance, not testing for a safety related defect would be more serious than a cosmetic issue.

Current methods do not offer automatic integrated field feedback to effectively optimize manufacturing test cases based on reported field failure data. Additionally, with current methods, there is a lack of re-using or enhancing existing manufacturing test cases. However, adding new test rules to the manufacturing test suite can continuously increase the size of the manufacturing test bucket and the manufacturing test cycle time.

SUMMARY OF THE INVENTION

The present invention addresses the deficiencies of the art in respect to the manufacturing test processes and provides a novel and non-obvious method, system and apparatus for dynamic optimization of manufacturing test coverage with automated integration of field failure feedback with the order configurator. In one embodiment of the invention, a manufacturing field failure feedback method can be provided. The method can include retrieving field failure data, analyzing the field failure data, storing failure analysis object information, modifying a manufacturing test case selection within the test case selection configurator based on using field failure data analysis, the test case selection including rules for test case selection and test case object information, and configuring a testing order with an optimized test case selection.

In another embodiment of the invention, modifying manufacturing test case selection can include storing new attributes as test case object information and modifying one or more rules for test case selection.

In yet another embodiment of the invention, configuring a testing order with an optimized test case selection can include selecting updated test cases based on the parts selection, the parts selection comprising rules for parts selection and parts object information.

In another preferred embodiment of the invention, a manufacturing field failure data processing system can be provided. The system can include a field failure datastore, a field failure analysis module coupled to the field failure datastore, an automated field failure feedback engine coupled to the field failure analysis module, the engine having program code enabled to retrieve field failure data, analyze the field failure data, store failure analysis object information, modify a manufacturing test case selection based on using field failure data analysis, the test case selection including rules for test case selection and test case object information, and configure a testing order with an optimized test case selection.

In yet another embodiment, the automated field failure feedback engine further includes failure analysis object information, a test case selection rule modifier coupled to the failure analysis object information, and an optimized order configurator coupled to the test case selection rule modifier, the configurator comprising rules for manufacturing test case selection and manufacturing test case object information.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for dynamic optimization of manufacturing test coverage with automated integration of field failure feedback. In an embodiment of the invention, field failure data associating characteristics of a manufactured product determined to have failed in the field can be collected for failure analysis. Based on the field failure analysis, an existing test case for the manufactured product can be modified to account for the characteristics in the collected field failure data. For example, field failure data such as an error code specifying a root cause of the failure exhibited in a product can be applied to an existing manufacturing test case. Thereafter, the field failure data can be applied to an existing manufacturing test case to account for characteristics associated with the collected field failure data by changing portions of manufacturing test cases to reflect greater test coverage of the product next time it is manufactured.

Figure 1:
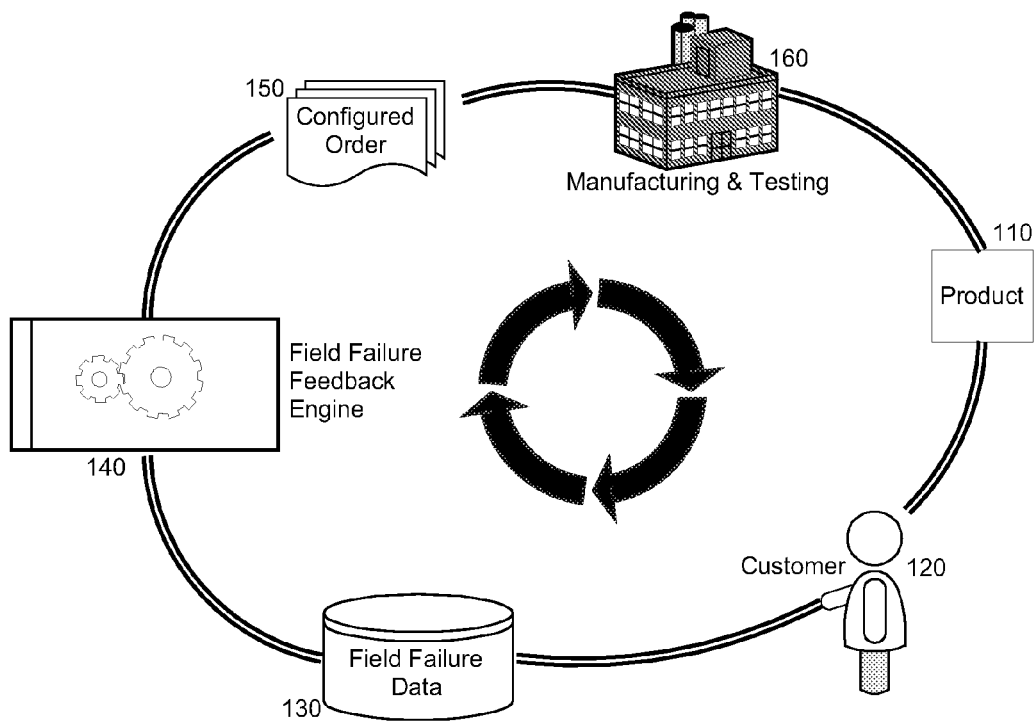
FIG. 1 is a pictorial illustration of a manufacturing supply chain network incorporating an automated field failure feedback engine.

In illustration, FIG. 1 is a pictorial illustration of a manufacturing supply chain network incorporating an automated field failure feedback engine. When a product 110 is shipped to a customer 120, related field failure data regarding issues arising in the field with the product can be stored in a field failure data store 130. During the order configuration development process, the field failure feedback engine 140 can analyze the type of failure, determine characteristics of failure that reflect a root cause of the failure, modify manufacturing test cases and configure the manufacturing testing order with an optimized test case selection in order to increase test coverage of parts with higher failure rates. The optimized configured testing order 150 can be sent along with the product order to the manufacturing facility for manufacturing and testing 160 and the feedback cycle from the field can repeat over again.

Figure 2:
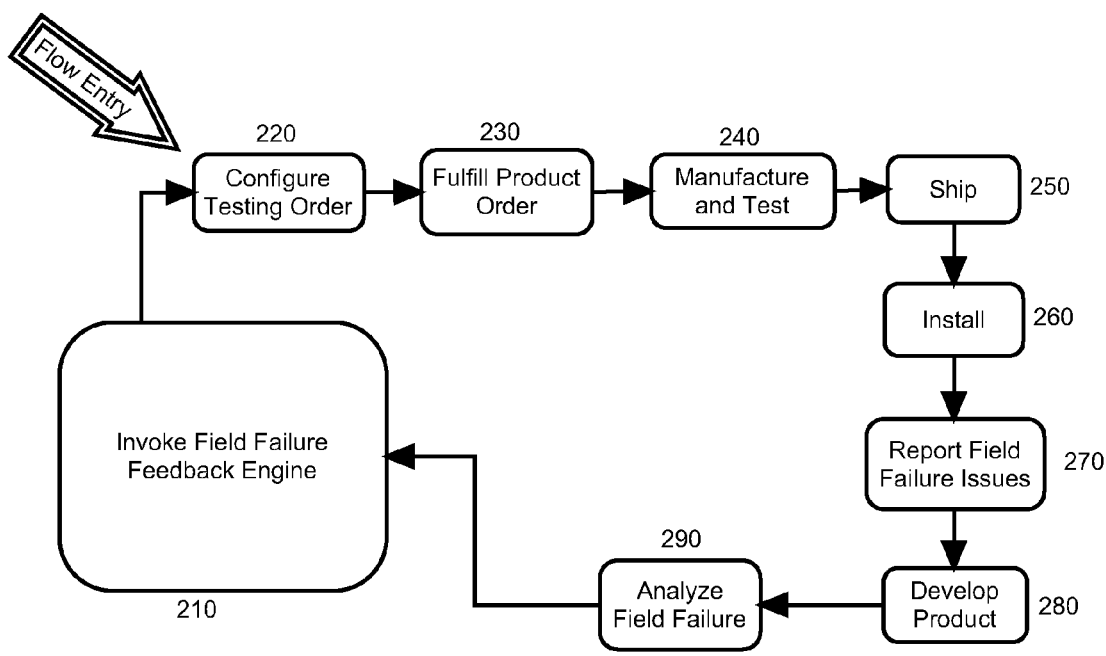
FIG. 2 is a flowchart illustrating a process for automated field failure feedback in a manufacturing supply chain process.

In further illustration of an automated field failure feedback engine, FIG. 2 is a flowchart illustrating a process for automated field failure feedback in a manufacturing supply chain process. A product can include a manufactured product component used in assembling a manufactured product. The field failure feedback engine 210 can be invoked during the order configuration development process. The field feedback is used to update the rules that select the test cases. The updates may happen offline. In block 220 the testing order can be configured along with fulfilling the product order 230. In block 240 the manufacturing product can be tested beforehand and the product manufactured and tested again afterwards and then shipped 250 to the customer. After installing the product in block 260 the field failure issues can be reported 270. In block 280 the product can be developed and the field failure issues can be analyzed in block 290. The feedback analysis can be given to both "Product Development Group" as well as used to update configurator rules that select test cases. Once the field failure issues are determined, they can be fed into the automated field failure feedback engine.

Figure 3:
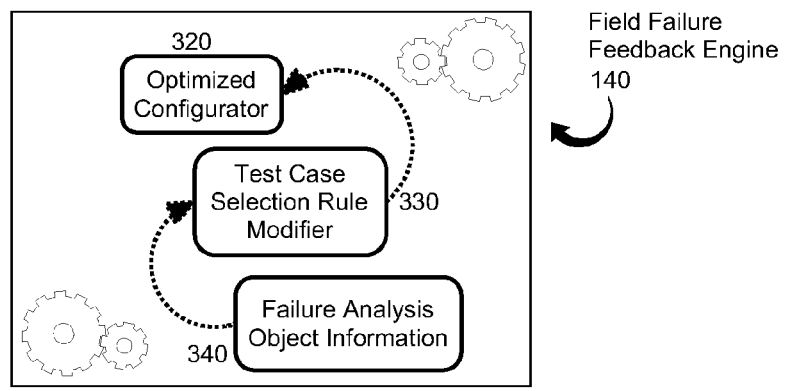
FIG. 3 is a schematic illustration of an automated field failure feedback engine.

In yet further illustration, FIG. 3 is a schematic illustration of an automated field failure feedback engine. The automated field failure feedback engine can include the optimized configurator 320, the test case selection rule modifier 330 and the failure analysis object information 340. The automated field failure feedback engine can have computer code enabled to analyze the test cases and modify them with new attributes responsive to field failure feedback.

Figure 5:
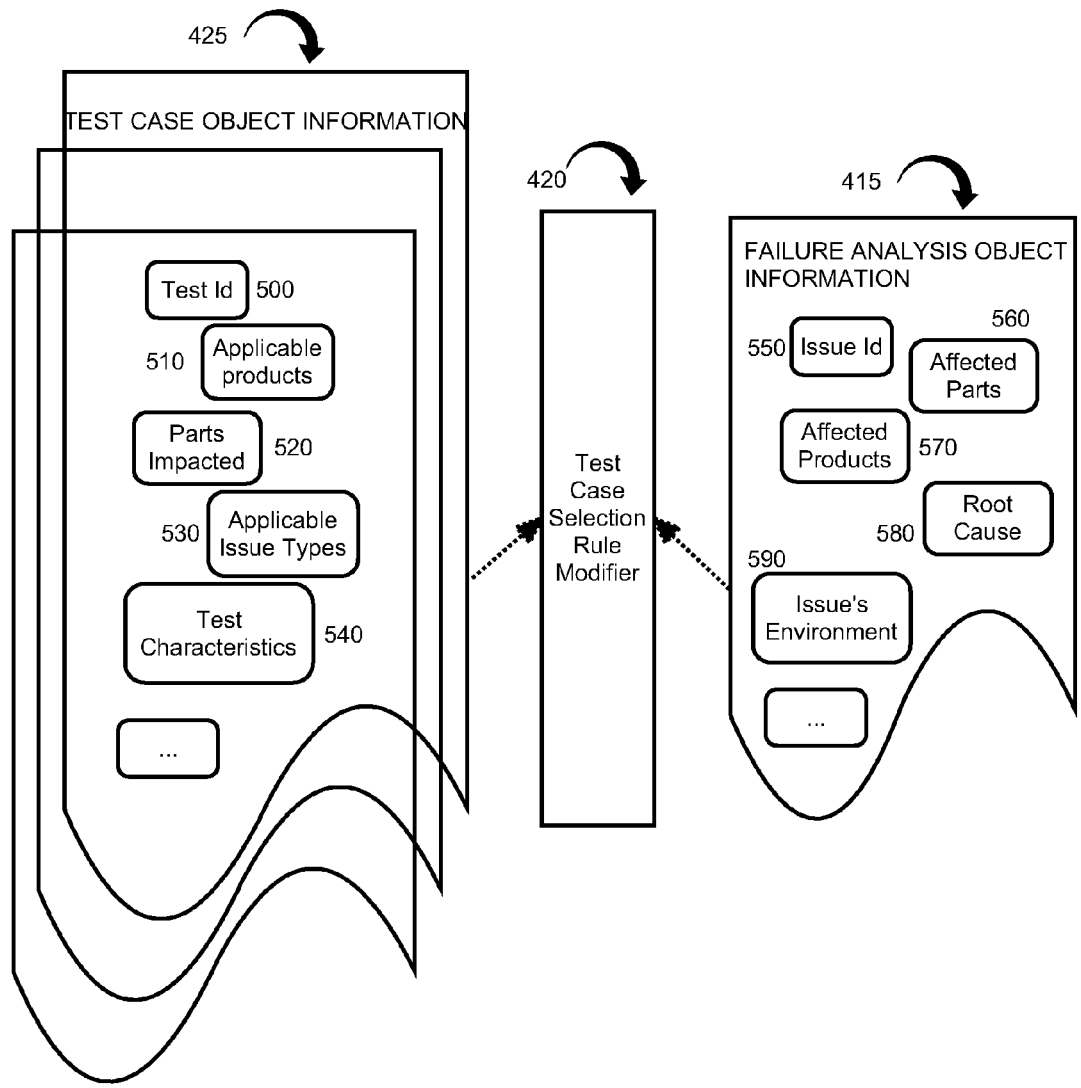
FIG. 5 is a block diagram illustrating attributes of the test case object information and failure analysis object information in FIG. 4.

The failure analysis object information 340 is a collection of root cause analysis information represented in a standard form (Refer to FIG. 5). The test case selection rule modifier 330 can incorporate the failure analysis object information 340 and can dynamically change the priorities of test cases, the applicability status of test cases, and selectively enable or disable certain manufacturing test cases. Additionally, the test case selection rule modifier 330 can change the association between a particular part selected to one or more test cases. The test case selection modifier can have necessary logic to relate the failure analysis information objects to test case object information and associated selection rules.

The optimized configurator 320 can incorporate the automatic feedback received from the test case selection rule modifier in order to fine-tune the rules that generate manufacturing test case selection. Additionally, the optimized order configurator 320 via automatic feedback from the test case selection rule modifier 330 can also recognize lack of issues in some areas and reduce testing in those areas. Issues with no test coverage can have potential manual intervention to identify brand new test cases as well.

Figure 4:
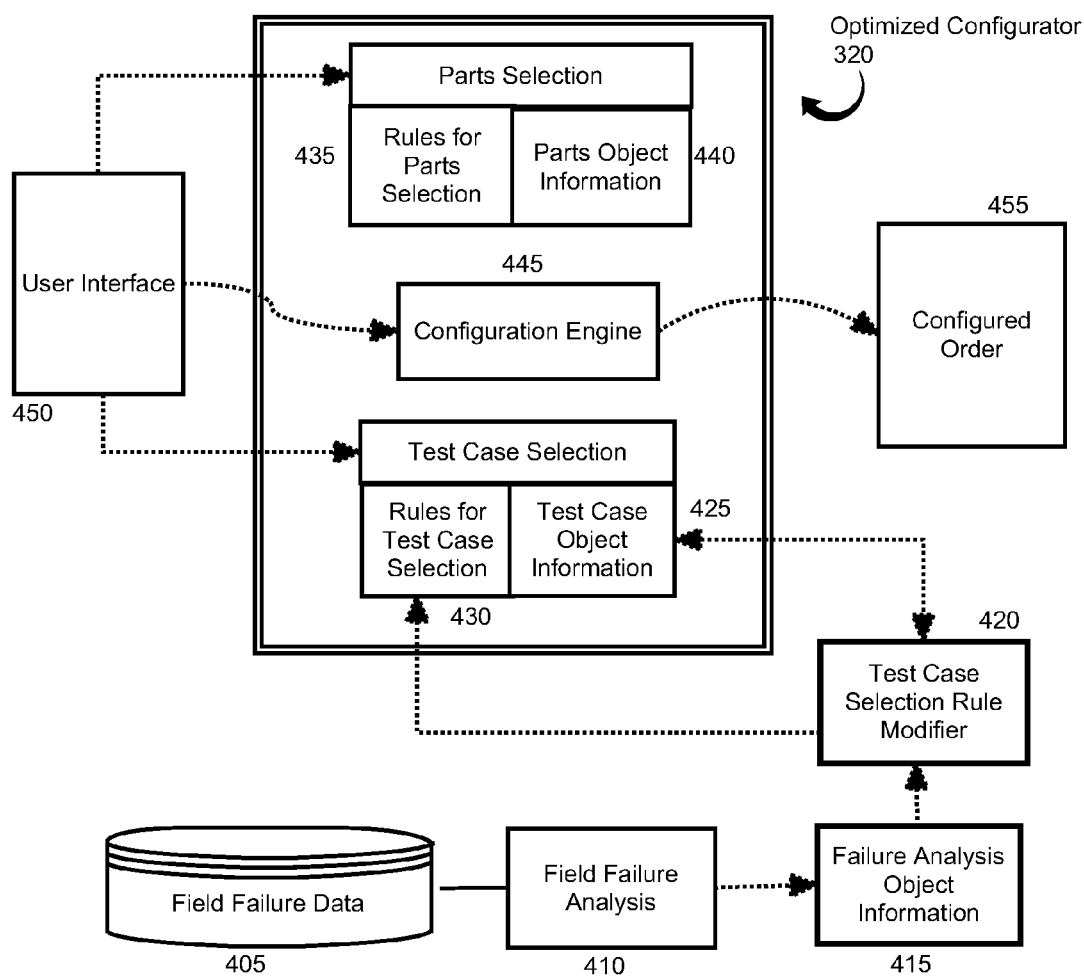
FIG. 4 is a schematic illustration of the automated field failure feedback engine incorporating an optimized order configurator of FIG. 3.

In further illustration, FIG. 4 is a schematic illustration of the automated field failure feedback engine incorporating an optimized order configurator of FIG. 3. Field Failure analysis module 410 can be coupled to a field failure datastore 405 that can include data associated with failures arising from products installed and used in the field. The failure analysis object information 415 can be coupled to the field failure analysis module 410 and the test case selection rule modifier 420. The optimized order configurator 320 of FIG. 3 can include a test case selection module containing test case object information 425 and rules for test case selection 430. The optimized order configurator 320 can also include an order configuration engine 445 and a parts selection module containing rules for parts selection 435, and parts object information 440. The test case selection rule modifier 420 can have computer code enabled to update test cases by incorporating the failure analysis object information 415 which can contain type of failure and root causes of a part or product.

Through a user interface 450, the optimized order configurator 320 can include a configuration engine 445 that can be enabled to take the updated test case object information 440 and rules modified by the test case selection rule modifier 420 and configure a testing order based on a product/part by incorporating the rules for parts selection 435 and parts object information 440. Thus after collecting field failure data for a manufactured product, the test case selection rule modifier 420 can modify an existing test case for the manufactured product to account for the characteristics in the collected field failure data, and apply the test case to the manufactured product.

Consequently, the configured testing order 455 can be accomplished by dynamically modifying the manufacturing test coverage and obtaining rigorous test cases for parts that fail more often and reduce testing on others which prove be reliable based on automated field failure feedback.

In even yet further illustration, FIG. 5 is a schematic illustration of attributes of the test case object information and failure analysis object information in FIG. 4. The test case object information 425 can have updated attributes which are relevant for establishing the relationship to the failure analysis objects information 415. The relationship of a failure analysis object 415 to test case object 425 can be 1 to n. Each failure analysis object 415 can represent the information gathered from field failure issues recorded.

The failure analysis object 415 will have attributes typically representing the type of failure and context of failure. For example, some attributes may include an issue id 550 that identifies a particular issue from the field failure analysis. Other attributes may be affected parts 560, affected products 570, an underlying root cause 580 such as 'bad component', 'bad connection' or 'bad interface' and an issue's environment 390 such as 'voltage', 'humidity', 'dust' and 'number of cycles'. The test case selection rule modifier can provide a relationship between the test case objects 425 and the failure analysis objects 415 in order to create new rules or modify existing rules for test case selection. The test case objects can have several attributes including test id 500, applicable products 510, parts impacted 520 such as 'memory' or 'motherboard', applicable issue types 530, and test characteristics 540 such as 'number of cycles', 'voltage', 'dust' and 'vibration'.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain or store the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A field failure feedback method comprising:
observing in a field failure engine executing in memory by at least one processor of a computer, field failure data for a manufactured product, the field failure data associating characteristics of the manufactured product determined to have failed once fielded, the field failure data comprising failure analysis object information comprising a collection of root cause analysis information, a test case selection rule modifier coupled to the failure analysis object information and rules for test case selection and test case object information;
modifying in memory of the computer an existing test case for the manufactured product to account for the characteristics in the collected field failure data; and
applying the manufacturing test case to the manufactured product.

2. The method of claim 1, wherein modifying an existing test case for the manufactured product to account for the characteristics in the collected field failure data, comprises modifying an existing sequence of manufacturing test cases to be applied as specified in a test case rule for the manufactured product to account for the characteristics in the collected field failure data.

3. The method of claim 1, wherein the manufactured product is a manufactured product component used in assembling a manufactured product.

4. The method of claim 1, wherein modifying an existing test case for the manufactured product to account for the characteristics in the collected field failure data, further comprises storing new attributes as test case object information and modifying one or more rules for test case selection.

5. The method of claim 1, further comprising storing new attributes as test case object information, relating the attributes to the configuration of a testing order and modifying one or more rules for test case selection.

6. The method of claim 1, wherein configuring a testing order with an optimized test case selection comprises selecting updated test cases based on a parts selection, the parts selection comprising rules for parts selection and parts object information.

7. A computer program product comprising a non-transitory computer usable storage medium embodying computer usable program code for manufacturing field failure feedback, the computer program product comprising:

computer usable program code for observing field failure data for a manufactured product, the field failure data in a data store associating characteristics of the manufactured product determined to have failed once fielded, the field failure data comprising failure analysis object information comprising a collection of root cause analysis information, a test case selection rule modifier coupled to the failure analysis object information and rules for test case selection and test case object information;

computer usable program code for modifying an existing test case for the manufactured product to account for the characteristics in the collected field failure data; and computer usable program code for applying the test case to the manufactured product.

8. The computer program product of claim 7, wherein the computer usable program code for modifying manufacturing test case selection further comprises storing new attributes as test case object information and modifying one or more rules for test case selection.

9. The computer program product of claim 7, wherein the computer usable program code for configuring a testing order with an optimized test case selection comprises selecting updated test cases based on a parts selection, the parts selection comprising rules for parts selection and parts object information.

10. The computer program product of claim 7, wherein the computer usable program code for modifying an existing test case for the manufactured product to account for the characteristics in the collected field failure data, comprises modifying an existing sequence of test cases to be applied as specified in a test case rule for the manufactured product to account for the characteristics in the collected field failure data.

11. A manufacturing field failure data processing system comprising:

a computer with memory and at least one processor;

a field failure data store coupled to the computer;

a field failure analysis module coupled to the field failure datastore and executing in the memory of the computer;

an automated field failure feedback engine coupled to the field failure analysis module, the engine comprising program code enabled upon execution in the memory of the computer to observe field failure data for a manufactured product, the field failure data associating characteristics of the manufactured product determined to have failed once fielded, the field failure data comprising failure analysis object information comprising a collection of root cause analysis information, a test case selection rule modifier coupled to the failure analysis object information and rules for test case selection and test case object information, to modify an existing test case for the manufactured product to account for the characteristics in the collected field failure data and, to apply the test case to the manufactured product.

12. The system of claim 1, wherein the test case selection rule modifier comprises program code enabled to dynamically change priorities of manufacturing test cases, the applicability status of test cases, and to selectively enable or disable manufacturing test cases.

13. The system of claim 12, wherein the program code of the test case selection rule modifier is further enabled to change an association between a particular part an at least one of the manufacturing test cases.

\* \* \* \* \*